United States Patent [19]

Milovanovich

[11] Patent Number: 5,019,857
[45] Date of Patent: May 28, 1991

[54] PROCESS AND DEVICE FOR AUTOMATED PRODUCTION OF IMAGES ON ALL TYPES OF PHOTOGRAPHIC SUPPORTS

[75] Inventor: André Milovanovich, Saint Sauveur, France

[73] Assignee: Caisse Regionale De Credit Agricole Mutuel De L'Yonne, France; a part interest

[21] Appl. No.: 334,953

[22] PCT Filed: Jun. 24, 1988

[86] PCT No.: PCT/FR88/00336
§ 371 Date: Feb. 23, 1989
§ 102(e) Date: Feb. 23, 1989

[87] PCT Pub. No.: WO88/10445
PCT Pub. Date: Dec. 29, 1988

[30] Foreign Application Priority Data

| Jun. 25, 1987 | [FR] | France | 87 08931 |
| Jun. 25, 1987 | [FR] | France | 87 08932 |
| Jul. 9, 1987 | [FR] | France | 87 09910 |
| Oct. 5, 1987 | [FR] | France | 87 13711 |
| Apr. 12, 1988 | [FR] | France | 88 04923 |

[51] Int. Cl.[5] ............... G03B 17/50; G03D 3/12
[52] U.S. Cl. ........................... 355/27; 354/322
[58] Field of Search .............. 354/319, 320, 321, 322, 354/325, 328; 226/170; 355/27, 28

[56] References Cited

U.S. PATENT DOCUMENTS

| 3,500,734 | 3/1970 | Lewis et al. | 354/88 |
| 3,550,520 | 12/1970 | Lucas | 354/323 |
| 3,727,815 | 4/1973 | Schwartz | 226/170 |
| 4,185,912 | 1/1980 | Schwartz | 354/322 |
| 4,695,143 | 9/1987 | Oshikoshi et al. | 354/86 |

FOREIGN PATENT DOCUMENTS

2161619A 1/1986 United Kingdom ............... 354/320

Primary Examiner—A. A. Mathews
Attorney, Agent, or Firm—William A. Drucker

[57] ABSTRACT

The device according to the invention comprises rolls ($R_1$ to $R_8$) for guiding a conveyor belt (26) on which supports with sensitive surfaces can be maintained by temporary adhesion over a path which passes successively through an exposure station (15) comprising an enlarger-type projection device (7), a treatment station (18) and an extractor (27). The films to be developed are applied to the belt (26) in a section of the path between the exposure station (15) and the treatment station (18). An appreciable reduction in the number of mechanical parts required in a automatic developer for films and sensitive paper can be achieved by the invention.

22 Claims, 4 Drawing Sheets

PROCESS AND DEVICE FOR AUTOMATED PRODUCTION OF IMAGES ON ALL TYPES OF PHOTOGRAPHIC SUPPORTS

The present invention relates to a process and device for the automated production of images on all types of photographic supports.

Numerous techniques have already been proposed for obtaining such productions, among which will only be mentioned:

the technique of reduced format instantaneous photography, using relatively simple mechanisms, and the techniques used by development laboratories for professional use (centralized photographic laboratories, automatic photographic mini-laboratories, automatic apparatus for identity photos, machines, colour photocopiers on photographic paper), these machines comprising relatively complex and costly mechanisms, such as rolls, gears, etc. . . . : according to these techniques, the sensitive paper is delivered in the form of rolls, which involves the use of a mechanism for advancing the paper and for cutting it to the format, an exposure system operating during stoppage of the paper, etc. . . .

It is then apparent that between the seeming simplicity of instantaneous photography and the complexity of the above mentioned photographic laboratories, there exists a technical and commercial vacuum.

The invention has then more particularly as object to fill this vacuum, with a process for reducing to a minimum the mechanical parts required for the development of films and sensitive papers, while making it possible to obtain excellent performances.

Generally, this process is applied to the production of images on supports able to record latent images developable in an apparatus requiring displacements of said support, particularly for transferring these supports from one processing station to another.

This process is more particularly characterized in that said displacements are provided by a conveyor belt on which the supports are held in position by temporary adhesion.

Advantageously, this adhesion may be obtained by means of a permanent adhesive covering said conveyor belt at least partially, by a permanent adhesive covering said support at least partially or even by suction means equipping the belt.

Thus, the invention solves in a particularly simple way the problem of moving the supports inside the apparatus, these supports being either photographic films or papers with sensitive photographic surfaces.

Furthermore, such simplification may be considerably increased by using at least one of the following arrangements:

the use of a flash for exposing the sensitive surfaces, the use of a conveyor belt, enclosed initially inside a cartridge, and on which the sensitive surfaces as well as, possibly, containers containing the processing products to be used are previously disposed and adhere, the use of means for vaporizing the chemical processing products on the sensitive surfaces, the use of a photographic apparatus associated with a light source for impressing the sensitive surfaces with an image.

Of course, the invention also relates to the apparatus for implementing the above defined process and embodiments of which will be described hereafter with reference to the accompanying drawings in which :

Figure 1:
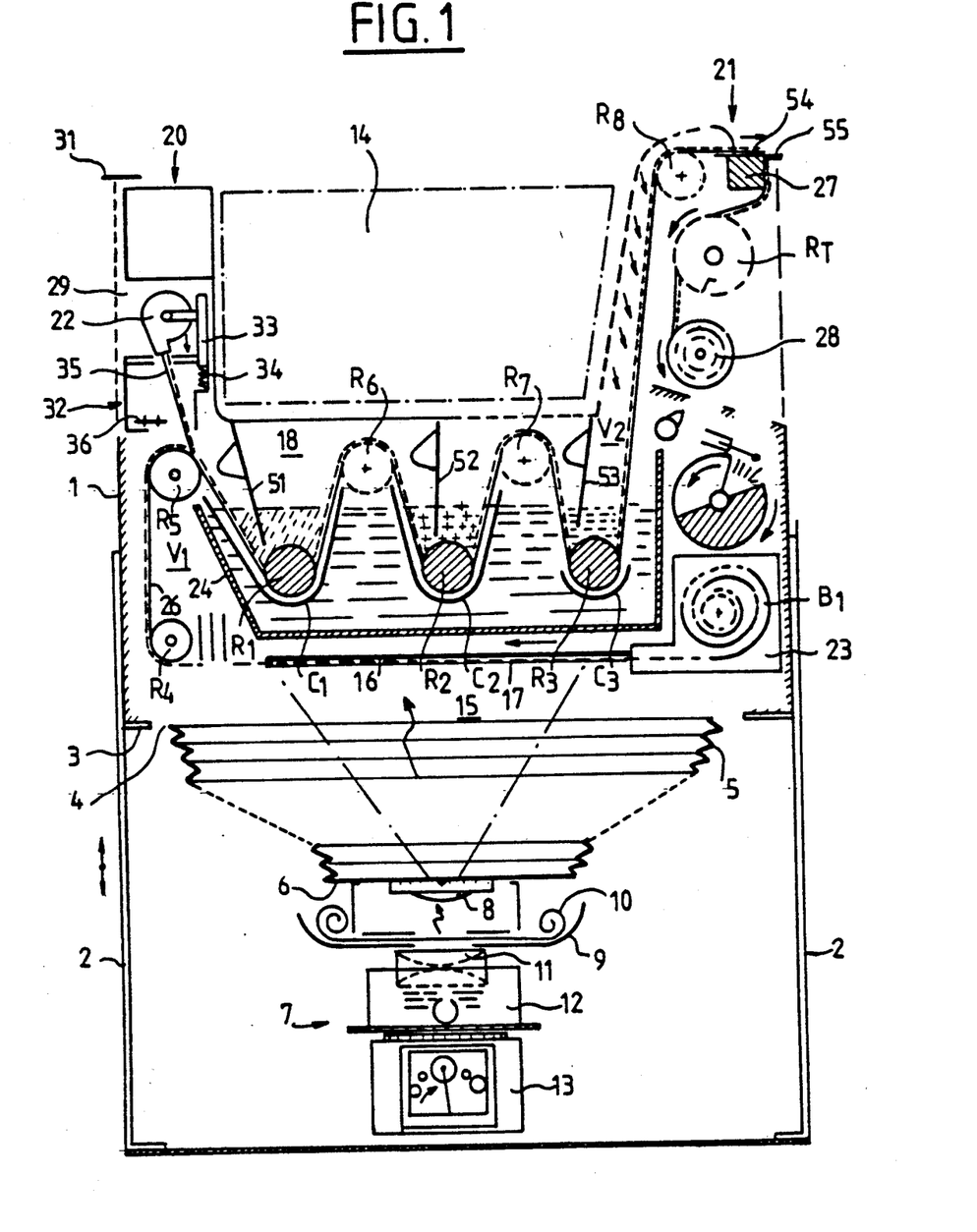
FIG. 1 is a vertical schematic sectional view of an automatic pocket photographic mini-laboratory.

Such as shown in FIG. 1, the pocket automatic photographic mini-laboratory is formed of a body 1 in the form of a case, mounted on retractable feet 2 and whose lower face 3, having an orifice 4, is equipped with a bellows 5 adapted to be housed, in the folded up position, inside case 1.

The bottom of this bellows is equipped with a plate 6 serving as a support for a removable enlargement assembly 7 similar to those used in conventional enlargers, which comprises more particularly:

an objective 8 with adjustable diaphragm for tests and enlargements, a slide carrier 9 for the film 10 to be enlarged, an optical condenser 11, a filter box 12 for the colour enlargements, a light source 13.

Advantageously, this light source 13 consists here of an electronic flash, the intensity and/or the duration of the light pulses of which may be adjusted as a function of the density of the negative and/or of the sensitivity of the photographic paper used, these parameters being detected by means of conventional detection members.

This enlargement assembly is designed so as to be readily removed after use and stored in a housing 14 provided for this purpose inside body 1.

The inner volume of the body is divided into two main parts, namely:

an exposure chamber 15 situated opposite opening 4 and comprising, in a plane on which the image focal plane of objective 8 may be brought, a plate 16 against which the photosensitive paper 17 may be applied, and a development chamber 18 disposed above the exposure chamber 15.

On each side of these two chambers 15, 18 are provided two lateral zones 20, 21 for receiving the cartridges 22, 23 containing the films and the sensitive surfaces as well as the main elements ensuring the displacements of these films or the sensitive surfaces inside the mini-laboratory.

The two chambers 15, 18 are separated vertically from each other by a container 24 containing, in a water bath, three tanks $C_1$, $C_2$, $C_3$ containing development products, these three tanks $C_1$, $C_2$, $C_3$ each comprising a curved bottom, in the concavity of which a guide roll $R_1$, $R_2$, $R_3$ is rotatably mounted, having a cylindrical anti-adhesive surface, these rolls $R_1$, $R_2$, $R_3$ forming part of a set of rolls for guiding a conveyor belt 26 usable both for transporting films and sensitive papers, and whose role will be defined later.

This assembly comprises more particularly:
- a first roll $R_4$ situated tangentially to the plane of plate 16 and opposite a passage volume $V_1$ in the lateral zone 20 between container 24 and body 1,
- a second roll $R_5$ situated opposite the passage volume V, above the container 24,
- third and fourth rolls $R_6$, $R_7$ situated respectively above the container 24, in the gaps between tanks $C_1$, $C_2$, $C_3$, and
- a fifth roll $R_8$ situated in the upper part of lateral zone 21, opposite a passage volume $V_2$ adjacent the housing.

The conveyor belt 26 is in the form of a reel $B_1$ contained in a removable cartridge 23 engaged in a housing situated in the bottom of the lateral zone 21. This cartridge has an outlet slit situated in the plane of plate 16, opposite roll $R_4$.

This belt 26 follows a path passing successively, flat over plate 16, over rolls $R_4$ and $R_5$, into tank $C_1$ and passing around roll $R_1$, over roll $R_6$ into tank $C_2$, around roll $R_2$, over roll $R_7$, into tank $C_3$, around roll $R_3$ then over roll $R_8$.

In this example, the belt 26 then passes over a part with an angular profile 27, over a traction roll RT driven by a step by step motor with adjustable step, then over a winding up mandrel 28.

In addition, body 1 comprises, in the upper part of its lateral zone 20, a housing 29 receiving a conventional type film cartridge 22, and with which a device 31 is associated for cutting off the film leader and a device 32 for automatically cutting the film at the end of unwinding.

In this example, the film cartridge 22 is placed in a sliding support 33 held in an initial position by spring 34. At the end of unwinding, the tractive force exerted by film 35 causes a movement of the support-cartridge 33-22 assembly against the action of spring 34, this movement then being used for actuating shears 36 which cut the film on leaving the cartridge.

As mentioned above, the transport of film 35, of the sensitive surfaces and possibly of other elements such, for example, as pockets containing development products, by means of the conveyor belt 26, is effected by temporary adhesion of these elements to said belt 26, by means of an adhesive coating said belt and/or said elements at least partially.

Figure 2:
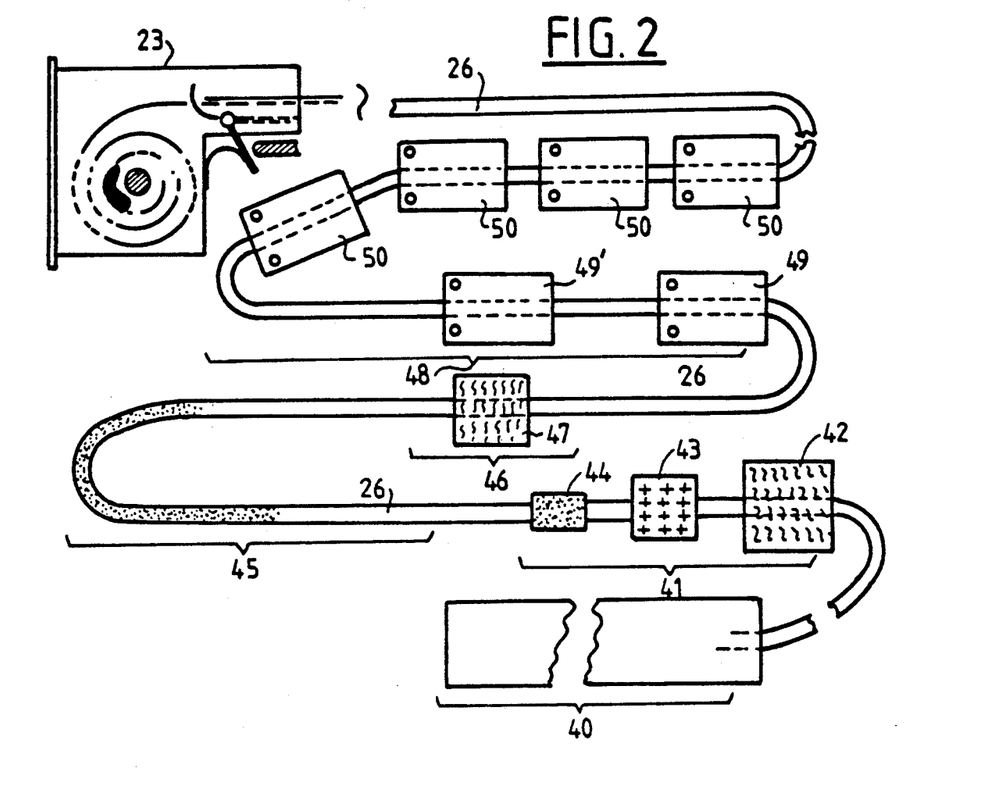
FIG. 2 is a schematic view showing a conveyor belt partially unwound from a cartridge, this belt having in particular sensitive surfaces and processing product pockets.

In the embodiment shown in FIGS. 1 and 2, this belt 26 is initially housed in a cartridge 23 and at the outset carries all the elements required for development and printing.

This belt 26, which has been shown partially unwound in FIG. 2, is relatively thin, impermeable to the chemical products and is made at least partially adhesive on one of its faces by known techniques. It comprises first of all a leader 40 of a length at least equal to the path which the photographs must follow inside the mini-laboratory. This leader 40 is not adhesive and has a greater fold resistance than the rest of the belt 26.

Leader 40 is first of all followed by a belt portion 41 on which three successive product pockets or cards 42, 43, 44 adhere, each containing a product required for developing a film (colour film developer 42, bleaching-fixing 43, print stabilizing product 44) then by a belt portion 45 of a length at least equal to that of a film, which is coated with an adhesive material. This adhesive portion 45 is followed by a portion 46 on which a card or pocket 47 adheres containing an additive for transforming the film developer into a paper developer.

The belt then comprises a portion 48 on which sensitive photographic surfaces 49, 49', 50 adhere successively between which pockets (not shown) may be disposed containing a developer regenerator.

The operation of the above described mini-laboratory is then the following:
- in a first step, the cartridge 23 is inserted into its housing then the leader is unwound and fed over the above defined path passing successively over plate 17 and about successive rolls $R_4$, $R_5$ $R_1$ $R_6$ $R_7$ $R_3$ $R_8$, until its end is engaged on the drive roll RT after passing over part 27,
- during a second step, the drive roll RT is actuated by its motor so as to cause belt 26 to travel until the beginning of portion 45 is situated substantially at the outlet of roll $R_5$.

Figure 3:
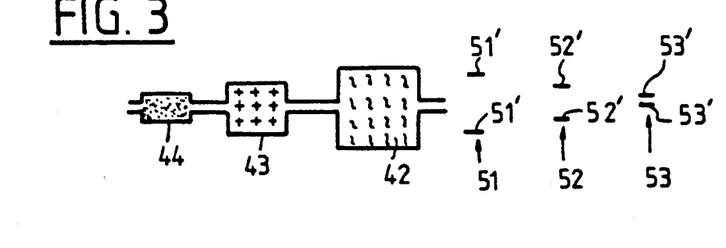
FIG. 3 illustrates one embodiment of means which can be used for perforating the pockets adhering to the belt shown in FIG. 2, for releasing the processing products into their respective tanks.

During this travel, pockets 42, 43, 44 containing the development products pass successively around rolls $R_1$, $R_2$, $R_3$ situated in the microtanks $C_1$, $C_2$, $C_3$. Each of these microtanks $C_1$, $C_2$, $C_3$ is equipped with a perforation or cutting mechanism 51, 52, 53 acting on a pocket 42, 43, 44 which is assigned thereto for releasing the development product which is to be contained in this tank. Thus, selective loading of the microtanks $C_1$, $C_2$, $C_3$ with development product is obtained. This result may be simply obtained, as shown in FIG. 3, by using rectangular pockets 42, 43, 44 of decreasing widths and perforation mechanisms 51, 52, 53 having axially offset cutting elements 51', 52', 53', so that the narrowest pocket 44 can only be perforated by the cutting elements 53' associated with the last tank $C_3$, so that the pocket of intermediate width 43 is perforated by the cutting elements 52' associated with the last but one tank $C_2$, and so that the widest pocket 42 is perforated by the cutting elements 51' associated with the first tank $C_1$. Because they are compressed by rolls $R_1$, $R_2$, $R_3$, these pockets will release the whole of the products they contain into the corresponding tanks.

The third step consists in disposing the cartridge 22 in its housing, removing the leader from the film by means of a small cutter 31 provided on body 1 and bringing the end of film 35 against the belt portion 45 coated with adhesive material passing over roll $R_5$.

The fourth step consists in causing belt 26 to travel, by means of the drive roll RT, at a speed appropriate to the desired processing time.

During this travel, film 35 applied on belt 26 by means of the adhesive will pass successively through the three tanks $C_1$, $C_2$, $C_3$ where it will undergo three successive processing operations. It will be automatically separated from belt 26 at the end of processing on passing over the angular profile part 27, so as to be then collected, the development then being finished. It should be noted in this connection that such separation is due to the fact that the relatively flexible conveyor belt 26 will follow the angular profile of part 27, whereas the more rigid film 36, initially guided by the upstream face 54 of this part 27, will continue its movement tangentially to this face 54.

The fifth step which begins after the end of development of film 35 consists in causing belt 26 to travel, still under the action of drive roll RT, until pocket 47 which contains an additive for transforming the film developer into paper developer has been perforated and has released its product into tank $C_1$.

The mini-laboratory is then ready to make paper prints.

It should however be noted that film 10, from which the prints are to be made, must be engaged in the film carrier 9 of the enlargement assembly and objective 8 must be suitably adjusted.

The first step of the printing phase is reserved for tests. For this, the first two sensitive surfaces 49, 49' supported by belt 26 serve for carrying out the tests; they are separated from each other and from the following sensitive surface 50 by a distance at least equal to the path which they must cover in the mini-laboratory, so that, when the first sensitive surface 49, once the image impressed, leaves the mini-laboratory, the second sensitive surface 49' is disposed against plate 17 and is ready to be impressed with the image to be reproduced, e.g. after correction of the colour filtering.

Once these tests have been carried out, the mini-laboratory may print the views contained in film 10 on the sensitive surfaces 50. Of course, the number of such sensitive sheets will correspond to the number of views on the film. The spacing between these sensitive surfaces may be equal to the length of said path. However, with appropriate arrangements of the rolls, this spacing may possibly be reduced to a fraction of the length of said path.

Advance of belt 26 will in all cases be provided by continuous or step by step rotation of the drive roll, each of the steps causing this belt to travel over a length equal to said spacing.

The sensitive surfaces are exposed depending on the case, either during the advance of the belt, whenever a sensitive surface 50 is correctly centred on plate 17, or during each stop of the belt.

In both cases, such exposure is obtained by an electronic flash 13 controlled in synchronism with the passage of the sensitive surface 50 over plate 17. The adjustment of the intensity and/or of the duration of the flash may then be provided, image by image, by any known process, particularly by means of an optoelectronic image analyzer acting on the electronic circuit of flash 13.

It is clear that once exposed the sensitive surfaces 50 driven by belt 26 will pass through tanks $C_1$, $C_2$, $C_3$ then, at the end of processing, will pass over the angular profile part 27 where they will be extracted.

As for the films, drying of the sensitive surfaces 50 takes place over the path between rolls $R_3$ and $R_8$.

Furthermore, container 24 may advantageously contain a liquid, for example water, kept at a constant temperature in which tanks $C_1$, $C_2$, $C_3$ are plunged. In this case, tank $C_3$ is completely immersed in the liquid. This liquid consequently receives the stabilization and rinsing product contained in pocket 44 assigned to said tank $C_3$.

It should further be noted that rolls $R_1$, $R_2$, $R_3$ disposed inside the tanks and situated on the same side as the adhesive coated belt are made from an anti-adhesive material.

Of course, the conveyor belt 26 used by the above described mini-laboratory could be of a non adhesive type. In this case, it would be advisable to provide an adhesive coat covering the backs of the films, of the processing product pockets and of the sensitive surfaces at least partially.

Similarly, it would be possible to use, instead of a plurality of sensitive surfaces separated from each other, a continuous strip of photosensitive paper.

Moreover, in the case where belt 26 is at least partially coated on one side with an adhesive layer, the other side of the belt may be advantageously made totally non adhesive, either by appropriate treatment, or by a non adhesive coating.

The purpose of such an arrangement will be to reduce to a minimum the tractive forces required for causing the belt to travel and to ensure smooth unwinding thereof from reel 23.

The angular profile part which has been shown in FIG. 1 in the form of a square section bar could be replaced by a small diameter roll. In both cases, tongues 55, situated on each side of belt 26, may be provided for preventing the sensitive surfaces from again adhering to the belt, after removal.

Figure 4:
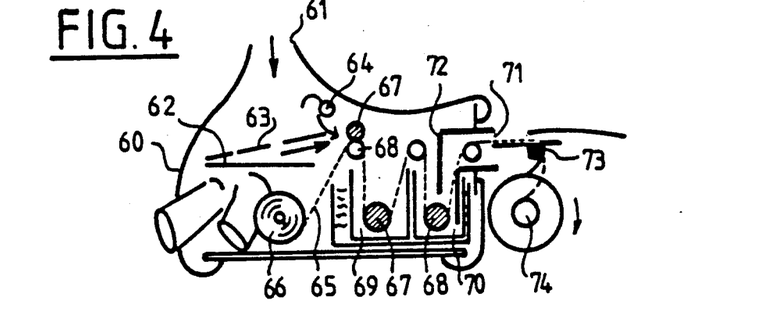
FIG. 4 is the schematic representation of a variant for using the optical system of an enlarger or photographic apparatus so as to obtain enlargements.

FIG. 4 shows a variant of construction of an apparatus of the invention, for using the optical system of an enlarger or a photographic apparatus in order to obtain enlargements. This apparatus is formed of a dark chamber 60 having at least one orifice 61 in which the objective of the enlarger or of the photographic apparatus may be engaged, in line with which a plate 62 is provided for supporting the sensitive surfaces, possibly equipped with a mask 63. In the vicinity of the support plate is disposed a device 64 for supporting the films to be developed.

This dark chamber further comprises a series of guide rolls for guiding a conveyor belt 65 initially contained on a reel 66 situated under the support plate 62 along a path passing successively between two rolls 67, 68 applying and consequently providing good adhesion of the films or of the sensitive surfaces on belt 65 about two rolls 67, 68 situated inside two respective tanks 69, 70 containing the development products, through an outlet orifice 71 provided in the wall of the dark chamber and equipped with a baffle 72 preventing any light from passing into the chamber, over an extractor 73 of the type shown in FIG. 1 and over a winding up mandrel 74 on which belt 65 may be wound up, this mandrel 74 being driven in rotation by a motor or manually.

The dark chamber 60 is further equipped with two sleeves 75 for handling operations inside the chamber without introducing light.

The operating principle of this apparatus is similar to that of the above described mini-laboratory. It only differs therefrom by a greater structural simplicity, by less automation and especially by the fact that it may be fitted to a conventional enlarger or to a photographic apparatus equipped with a light source and a film carrier allowing it to operate as an enlarger.

Contrary to the example shown in FIG. 1, it uses commercially available sensitive sheets precut to the format which are made fast with the conveyor belt 65, by means of an adhesive material, inside the apparatus. Of course, such adhesion may be provided before or after exposure.

Thus, by a simple adaptation, the mini-laboratory described in FIG. 1, as well as all the apparatus in accordance with the present invention, may operate according to this principle.

Figures 5, 6, 7:
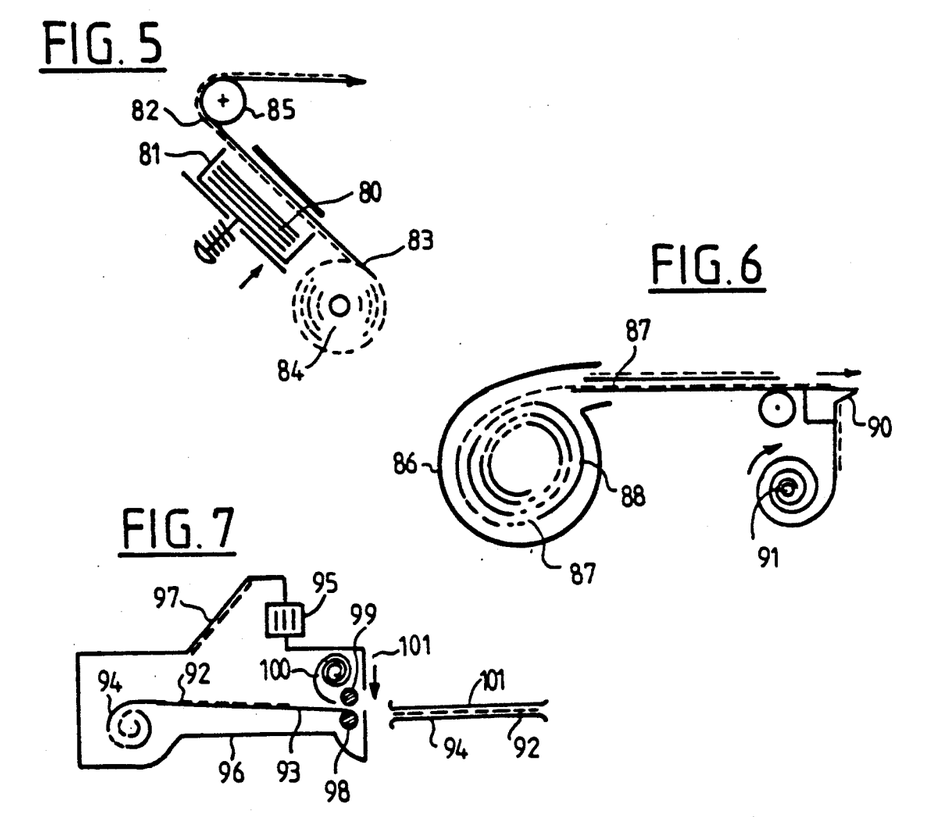
FIG. 5 shows one embodiment of an apparatus for distributing sensitive surfaces over a conveyor belt.
FIG. 6 is a schematic representation of a distributor using a conveyor belt.
FIG. 7 is a schematic sectional view of a photographic apparatus using positive direct type sensitive surfaces transported by a belt.

In this case, it is necessary to provide a sensitive surface distributor such for example as the one shown in FIG. 5, for applying the sensitive surfaces sheet by sheet on the belt previously coated with an adhesive.

In this example, the sensitive surfaces 80 are stacked in the drawer 81 of a sensitive surface loader adapted so as to distribute the surfaces 80, one by one, over the adhesive face 82 of a conveyor belt 83 coming from a reel 84 and guided in the distribution plane of the loader by a roll 85.

Such a distributor could also comprise a loader in the form of a cartridge 86 containing a conveyor belt 87 on which sensitive surfaces 88 adhere (FIG. 6).

In this case, the distributor may use a device causing belt 87 to travel over an extraction device which may consist of a part with angular profile 90, of the type shown in FIG. 1 or over a small diameter roll, the belt then being wound up on a mandrel 91.

The invention also applies to a photographic apparatus using sensitive surfaces of direct-positive type on supports (e.g. opal), such as those used in automatic portrait apparatus.

In this case, as shown in FIG. 7, the sensitive surfaces 92 are carried by an adhesive conveyor belt 93, initially wound up in the form of a reel 94, which pass successively through an exposure area situated in the field of the objective 95 of apparatus 96 after reflection from a mirror 97 and between two rolls 98, 99 situated opposite an outlet orifice of the apparatus. Between these two rolls 98 and 99, one of which is a drive roll and the other a presser roll, there also passes a second strip 100, not necessarily adhesive and opaque to light, coming from a reel. After exposure and passage between the two rolls 98, 99 and cutting to the dimensions of the print (blade 101), at the outlet of the apparatus an exposed sensitive surface is obtained but protected from the light by the portion of the adhesive belt 94 and by the strip portion 101 which adheres to the belt at the periphery of the sensitive surface.

By means of a simplified microdeveloper, it is then possible to produce a photographic apparatus delivering instantaneous views.

As mentioned above, the enlargement assembly used in an apparatus according to the invention may advantageously consist of a conventional picture taking apparatus with which a light source is associated. Such an apparatus may be of the self focussing type or not, of the multifocal type or even have an electrically controlled zoom.

Figure 8:
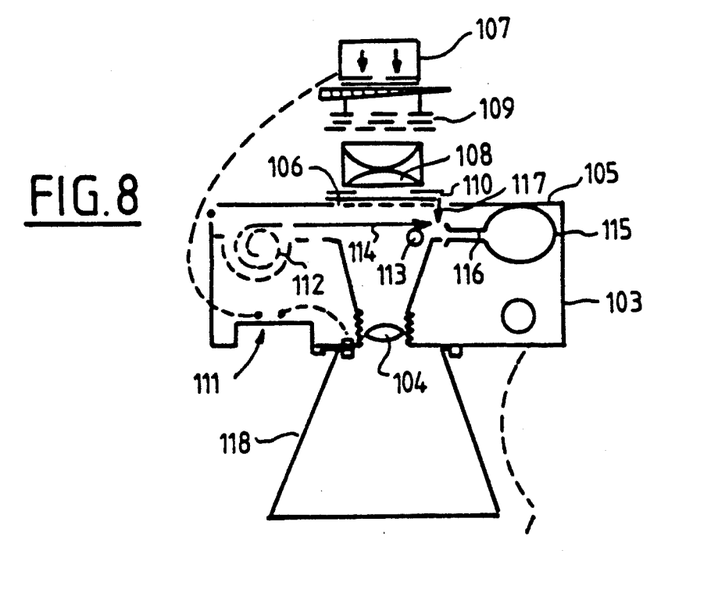
FIG. 8 is a schematic sectional view of an enlargement assembly formed from a photographic apparatus.

FIG. 8 shows such an enlargement assembly formed from a self focussing type photographic apparatus.

This photographic apparatus comprises a conventional type case 103 having, on its front face, an axially movable objective 104 and, on its rear face, a cover 105 having a window 106 in the axis of which a light source is removably mounted formed by an electronic flash 107, a condenser 108, positions for filters 109 as well as a film carrier 110 for individual pictures. Advantageously, the flash unit used for the enlargements consists of a removable flash normally equipping the apparatus and housed in a recess 111 of the front face. As in any photographic apparatus, the case 103 comprises an exposure zone on each side of which may be disposed a cartridge 112 feeding unexposed film, a receiving reel (or cartridge) receiving at least temporarily the image impressed films and a pinion 113 for advancing the film 114, whose teeth are engaged in the lateral perfOrations of this film 114. This assembly (feeding reel/receiving reel/pinion) serves as a slide carrier in the case where the photographic apparatus is used as an enlarger.

In this example, instead of a conventional receiving reel, a special cartridge 115 is used for receiving the exposed film. This cartridge 115 may be removed from the apparatus without exposing the portion of the film housed in the exposure chamber. It comprises a cylindrical portion adapted for containing all or part of a conventional type film and a flat reception end piece 116 for alone containing one view, so as to be able to develop and print the film view by view. For this, the photographic apparatus is provided, at the level of the inlet orifice of cartridge 115, with a knife 117 for cutting each view after exposure.

It is clear that, during picture taking, the light source 107, 108, 109 is removed and window 106 is closed. Development may then be carried out using a mini-laboratory of the type shown in FIG. 1.

As far as prints and enlargements are concerned, the photographic apparatus may be mounted on the mini-laboratory, either on the support plate equipping the bellows 5 or on a removable tubular piece 118 replacing the bellows.

Of course, the electric and electronic circuits of the photographic apparatus and those of the mini-laboratory may be coupled together so as to use in the best possible way the automatic devices as well as the detection and adjustment systems of the photographic apparatus.

Advantageously, the photographic chemical treatments required for using the apparatus of the invention may be provided by aerosols from aerosol sprays, replacing the baths contained in the tanks.

Figure 9:
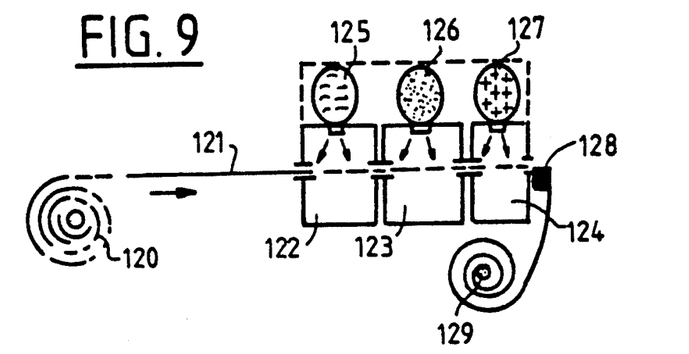
FIG. 9 illustrates one embodiment of a processing unit, in which the processing operations are carried out by means of aerosols from aerosol sprays.

FIG. 9 illustrates a first embodiment of a processing unit, in which a film and/or sensitive surfaces coming from a cartridge 120 of the type shown in FIG. 2, are driven by a conveyor belt 121 and pass through three successive compartments 122, 123, 124 where the processing is carried out.

Each of these compartments is equipped with an aerosol spray 125, 126, 127 disposed so as to spray an appropriate processing product over the sensitive surface.

On leaving the last compartment 124, the belt passes over an extractor 128 of the type shown in FIG. 1 before being wound on a mandrel 129, after extraction of the sensitive surfaces.

Of course, controlling the spray of processing products by sprays 125, 126, 127 (in the form of aerosols) may be provided in many ways, particularly by means of an electrically controlled device.

Figure 10:
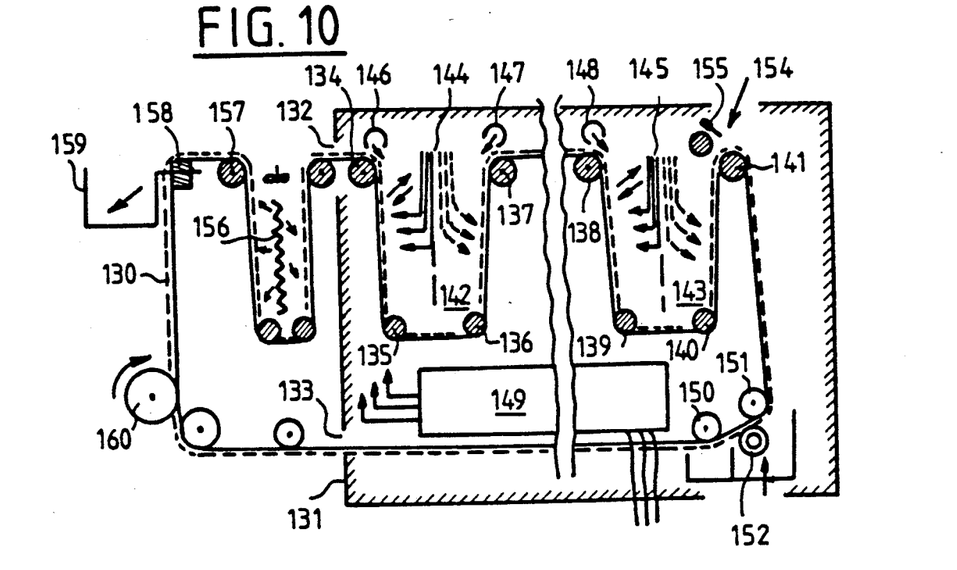
FIG. 10 is a schematic representation of another embodiment of an apparatus according to the invention.

FIG. 10 is a schematic representation of another embodiment of an apparatus in accordance with the invention which uses a conveyor belt 130 in a closed loop with regeneration or continuous (or semi-continuous) reapplication of the adhesive material. This apparatus may in particular be used for processing colour negatives, direct positive colour, reversible colour on films, black and white and corresponding enlargements, including colour photocopying on photographic paper, without changing tanks. This apparatus further uses the technique of vaporizing the photographic chemical products, e.g. by means of a pump mechanism or by the action of a compressed gas, particularly compressed air, for certain products (bleaching-fixing).

This apparatus comprises a thermally insulating enclosure 131 having a conventional structure with double walls with a vacuum therebetween and heat reflecting surfaces.

This enclosure 131 has, on one of its sides, two vertically staggered slits 132, 133 for the passage of the conveyor belt 130.

In the upper part of the inner volume of this enclosure, this belt is guided by a plurality of rolls 134 to 141, so as to travel over a crenelated path, whose upwardly oriented concavities 142, 143 define processing volumes in which are placed ramps 144, 145 for injecting processing products, each ramp being assigned to a given product.

Moreover, at the level of the guide rolls 134, 137, 138 situated in the upper part of the processing volumes 142, 143, nozzles 146, 147, 148 are disposed for injecting a gas or a gas composition for drying between two processing operations.

The processing rate may be increased by ultrasonic emission inside volumes 142, 143 by means of suitably placed emitters, and by heating the processing products by means of a heating device 149.

Injection of the products may be done by sweeping by moving the injectors 144, 145 in a horizontal plane over a path substantially equal to the width of the sensitive surface to be processed carried by the conveyor belt 130.

In the lower part of the inner volume of enclosure 131, the conveyor belt 130 passes over a mechanism 150, 151, 152 for dissolving, after a certain number of passes, the residual adhesive which covers it and replacing it by a new adhesive layer.

Downstream of this device, but upstream of the first processing volume 143, the conveyor belt 130 passes between two rolls 141, 153 adapted so as to receive and apply the sensitive surfaces to be processed on the adhesive layer. These sensitive surfaces are conveyed into enclosure 131 through an orifice 154 situated opposite rolls 141, 153. A detector 155 placed at the level of this orifice 154 triggers the processing cycle each time a sensitive surface passes.

After leaving enclosure 131 through the upper slit 132, the conveyor belt 130, which carries the processed sensitive surfaces passes successively through a drying station 156, over a first drive roll 157, an extractor 158 of the type shown in FIG. 1 associated with a tank 159 for receiving the sensitive surfaces once processed and dried and over a second drive roll 160. The belt penetrates into enclosure 131 through the lower slit 133.

Of course, the invention is not limited to the above described embodiments.

Thus, for example, the temporary adhesion of the sensitive surfaces to the belt could be provided other than by means of an adhesive.

Figure 11:
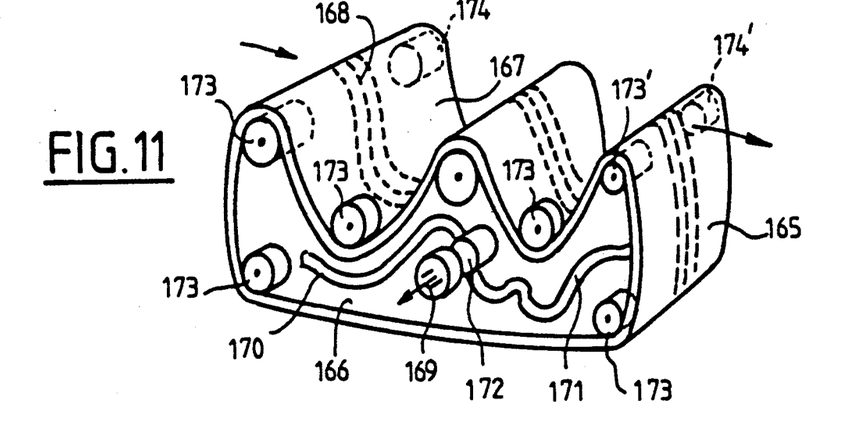
FIG. 11 shows one embodiment of a conveyor belt in which the temporary adhesion of the supports is provided by suction.

Such temporary adhesion could be provided particularly by suction, as in the example shown in FIG. 11.

In this figure, the conveyor belt 165 which forms an endless loop guided by rolls, has a tubular structure with, on the side situated inwardly of the loop, a sealed surface 166 and, on the other side, a face 167 having in its median part a series of perforations forming a suction grid 168. The inner volume of this belt 165, which forms a sort of movable chamber, is connected to a suction duct 169 by flexible tubes 170, 171 connecting a rotary connection 172 fitted to duct 169 to orifices provided on the sealed face 166.

It should be noted that, contrary to the above described embodiments, the rolls used for guiding belt 165 do not extend over the whole width thereof. They are mounted in pairs of coaxial rolls 173, 174 which are only applied on the side edges of belt 165, so as to make possible the passage of flexible pipes 170, 171 and to avoid any pressure on the central part of the belt including the suction grid 168.

This conveyor belt 165 may be used similarly to those described above with extraction devices based on similar principles (small diameter rolls 173', 174').

I claim:

1. Process for producing images on independent supports, each having a rear face and a sensitized front face able to record a latent image in a photographic development apparatus, comprising successively an exposure station, a plurality of processing stations for carrying out a development and for drying the supports, an extracting station and a driving station, wherein the supports, once developed and dried, are extracted, said process comprising:

i—an initial phase of storing a succession of said supports on a belt, during which phase the supports are disposed, unit by unit, on the belt at given positions and are carried and held in position on this belt by temporary adhesion by means of an adhesive material, said belt adhering on said rear face in a region located behind said image; and ii—a phase of transferring the supports by exerting on the belt a traction in the driving station, so as to cause a continuous advance movement of the belt and by guiding the belt, so as to move the supports along a path passing through said stations according to a sequence comprising:

an exposure step which is effected by an enlarger using a light source consisting of an electronic flash controlled in synchronism with the passage of the supports over an exposure area;

a development step in the processing station;

a drying step;

an extraction step in the extracting station, wherein the supports are separated from the belt by forcing said belt to follow a curved path having a small radius of curvature.

2. Process according to claim 1, wherein the belt has a front side which is thin, resistant to chemical products and coated, at least partially, with a permanent adhesive, and a rear side which is made totally non adhesive for avoiding high tensions of the belt.

3. Process according to claim 1, wherein the supports have a front side able to record latent images, and a rear side made at least partially adhesive, whereas the conveyor belt carrying these surfaces unit by unit is totally non adhesive.

4. Process according to claim 1, wherein the supports able to record a developable latent image are initially contained in a drawer and are removed therefrom by said conveyor belt.

5. Process according to claim 2, wherein the belt is guided by guiding means comprising rolls facing the adhesive of the belt which are made from a non adhesive material.

6. Process according to claim 1, wherein said belt forms a closed loop.

7. Process according to claim 6, wherein the external surface of the belt carries an adhesive coating automatically regenerated during travel of the belt.

8. Process according to claim 1, wherein the belt on which said supports are stored by temporary adhesion, is initially wound inside a cartridge.

9. Process according to claim 1, wherein the belt which carries said supports also carries chemical products contained in containers, and is initially wound inside a cartridge.

10. Process according to claim 1, wherein the supports have sensitive surfaces which are held on the belt by temporary adhesion and are processed by injection of a processing product.

11. Process according to claim 10, wherein said injection of the processing product is carried out by sweeping over a horizontal plane along a path substantially equal to the width of the sensitive surface to be processed of the said supports.

12. Process according to claim 10, wherein said processing products are coming from containers containing propulsive gas.

13. Process according to claim 1, wherein the development step, the said supports are subjected to an emission of ultrasounds and are heated.

14. Process according to claim 1, wherein the electronic flash generates light pulses having an intensity and duration which may be adjusted.

15. Process according to claim 1, wherein the exposure step is effected by means of a removable projection device formed of a photographic apparatus equipped with a light source.

16. Process according to claim 15, wherein said light source consists of a removable flash equipping the photographic apparatus.

17. Process according to claim 15, wherein said photographic apparatus comprises a detection and adjustment system which is connected to a control electronic circuit of the said development apparatus.

18. Process according to claim 15, wherein said exposure step is effected by means of a photographic apparatus used as enlarger and comprising a delivery reel/-receiving reel/pinion assembly which serves as film carrier of the enlarger.

19. Process according to claim 15, wherein the photographic apparatus used as enlarger comprises a receiving reel with a reception end piece able to contain a single view.

20. Process according to claim 19 wherein the photographic apparatus contains a cutting system for obtaining images one by one from a sensitive surface roll.

21. Process according to claim 15 wherein the photographic apparatus takes positive direct instantaneous view and comprises means for processing by vaporization from a spray containing propulsive gas.

22. Process according to claim 1, wherein said support comprises sensitive surfaces which, once exposed, are protected from the outside light by an adhesive strip opaque to the light.

* * * * *